(12) United States Patent
Madoux et al.

(10) Patent No.: US 12,434,555 B2
(45) Date of Patent: Oct. 7, 2025

(54) FUEL STORAGE DEVICE COMPRISING A DEVICE FOR MANAGING GASES FROM A CANISTER

(71) Applicant: PLASTIC OMNIUM ADVANCED INNOVATION AND RESEARCH, Brussels (BE)

(72) Inventors: Dominique Madoux, Brussels (BE); Changwook Shin, Brussels (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 0 days.

(21) Appl. No.: 18/853,850

(22) PCT Filed: Apr. 6, 2023

(86) PCT No.: PCT/EP2023/059161
§ 371 (c)(1),
(2) Date: Feb. 24, 2025

(87) PCT Pub. No.: WO2023/194543
PCT Pub. Date: Oct. 12, 2023

(65) Prior Publication Data
US 2025/0178431 A1    Jun. 5, 2025

(30) Foreign Application Priority Data
Apr. 7, 2022    (LU) ........................................ 501816

(51) Int. Cl.
*B60K 15/035*    (2006.01)
*B60K 15/03*    (2006.01)
(52) U.S. Cl.
CPC .. *B60K 15/03519* (2013.01); *B60K 15/03504* (2013.01); *B60K 2015/03302* (2013.01); *B60K 2015/03509* (2013.01)

(58) Field of Classification Search
CPC ........ B60K 15/03519; B60K 15/03504; B60K 2015/03302; B60K 2015/03509
See application file for complete search history.

(56) References Cited

U.S. PATENT DOCUMENTS

| 5,957,113 A | 9/1999 | Masaki et al. |
| 2004/0000352 A1 | 1/2004 | Kojima et al. |

(Continued)

FOREIGN PATENT DOCUMENTS

| DE | 103 17 583 A1 | 11/2003 |
| EP | 1 124 053 A2 | 8/2001 |

(Continued)

OTHER PUBLICATIONS

Machine translation of DE 10317583 (Year: 2003).*
International Search Report issued May 11, 2023 in PCT/EP2023/059161, filed on Apr. 6, 2023, 2 pages.

*Primary Examiner* — Patrick C Williams
(74) *Attorney, Agent, or Firm* — Oblon, McClelland, Maier & Neustadt, L.L.P.

(57) ABSTRACT

A fuel storage device for a motor vehicle that includes a fuel tank, a canister fluidically connected to the fuel tank, at least one separation unit configured to receive the mixture of air and hydrocarbon vapors from the canister and to separate said mixture into a hydrocarbon-rich fraction and a hydrocarbon-poor fraction, the hydrocarbon-rich fraction being sent to the fuel tank, return means for returning the hydrocarbon-poor fraction to the canister, a purge pump for purging the canister which is arranged between the canister and the separation unit, at least one solenoid valve configured to selectively send the mixture of air and hydrocarbon vapors either to the separation unit or to the fuel tank.

14 Claims, 1 Drawing Sheet

(56) References Cited

U.S. PATENT DOCUMENTS

| | | |
|---|---|---|
| 2011/0214646 A1 | 9/2011 | Makino |
| 2012/0260892 A1 | 10/2012 | Menke et al. |
| 2016/0258390 A1* | 9/2016 | Makino ............ B60K 15/03504 |
| 2017/0030302 A1* | 2/2017 | Takezawa ............ F02M 25/089 |
| 2017/0045007 A1* | 2/2017 | Pursifull .......... B60K 15/03504 |
| 2020/0189385 A1* | 6/2020 | Dudar ............. B60K 15/03504 |

FOREIGN PATENT DOCUMENTS

| | | |
|---|---|---|
| EP | 1 359 311 A2 | 11/2003 |
| JP | H 10-274106 A | 10/1998 |
| JP | 2003-314379 A | 11/2003 |
| JP | 2003-314381 A | 11/2003 |

\* cited by examiner

FUEL STORAGE DEVICE COMPRISING A DEVICE FOR MANAGING GASES FROM A CANISTER

The invention relates to fuel storage devices for motor vehicles, and more specifically to devices for managing a mixture of air and hydrocarbon vapors from this fuel storage device. The invention also concerns a method for managing a mixture of air and hydrocarbon vapors from the fuel storage device according to the invention.

FIG. 1 shows a fuel storage device according to the prior art.

Fuel can be stored in a fuel tank 2. This comprises a fuel pump 4, a fuel fill limiter 6 and an aeration device 8. These elements are known and will not be described in detail in this application.

A canister 10 housing a filter is fluidically connected to the fuel tank 2 and collects hydrocarbon vapors from the fuel tank 2; the filter for example comprises activated carbon trapping these hydrocarbon vapors, and the canister 10 further comprises an air intake 12 allowing air to enter or exit the canister 10.

The canister 10 must be purged regularly. This can be achieved by using a separation unit 14 for separating a mixture of air and hydrocarbon vapors, with a purge pump 16 for purging the canister 10 placed in the fluid connection between canister 10 and the separation unit 14. The separation unit 14 is also fluidically connected to the fuel tank 2. A return line 18 fluidically connects the separation unit 14 to the canister 10 via a fluid connection other than the one carrying the purge pump 16. A vacuum pump 20 is placed in the fluid connection between the separation unit 14 and the fuel tank 2.

The operation of the device disclosed above is as follows: when it is necessary to purge the canister 10, the purge pump 16 is activated and extracts a mixture of air and hydrocarbon vapors (vapors that have been captured by the activated carbon of the canister 10) from the canister 10, which are then conveyed to the separation unit 14. This separation unit 14 separates the incoming mixture into two fractions: a hydrocarbon-rich fraction and a fraction poor in hydrocarbon vapors. The hydrocarbon-rich fraction is sent to the fuel tank 2. The vacuum pump 20 in the fluid connection between separation unit 14 and fuel tank 2 creates a pressure differential upstream and downstream of the separation unit 14. The fraction poor in hydrocarbon vapors is sent to canister 10 via the return line 18.

In parallel with this canister purging mechanism, a diagnostic pump 22 is connected to the tank to perform on-board diagnostics (OBD) of the fuel tank 2. When desired, this diagnostic pump 22 increases the pressure inside the fuel tank 2. The evolution of this pressure is monitored to check that there are no leaks in the fuel tank 2.

The architecture disclosed above has a disadvantage in terms of complexity, integrating a significant number of pumps and systems dedicated to a single application.

Document DE 103 17 583 A1 discloses a fuel storage device for a motor vehicle comprising a fuel tank, a canister connected to the fuel tank, a purge pump for purging the canister and a set of separation units. Solenoid valves are used to guide a mixture of air and hydrocarbon vapors from the canister to one separation unit or another, depending on the concentration of hydrocarbon vapors in the mixture extracted from the canister.

In particular, the invention aims to provide a fuel storage device that is less complex and requires fewer components than in the prior art.

To this end, the invention relates to a fuel storage device for a motor vehicle comprising:
   a fuel tank,
   a canister fluidically connected to the fuel tank and configured to receive a mixture of air and hydrocarbon vapors from the fuel tank,
   at least one separation unit fluidically connected to the canister and the fuel tank, the separation unit being configured to receive the mixture of air and hydrocarbon vapors from the canister and to separate said mixture into a hydrocarbon-rich fraction and a hydrocarbon-poor fraction, the hydrocarbon-rich fraction being sent to the fuel tank,
   return means for returning the hydrocarbon-poor fraction to the canister,
   a purge pump for purging the canister which is arranged between the canister and the separation unit,
   at least one solenoid valve arranged between the purge pump and the separation unit, said at least one solenoid valve being configured to selectively send the mixture of air and hydrocarbon vapors either to the separation unit or to the fuel tank.

In this way, at least one solenoid valve is used to guide the mixture of air and hydrocarbon vapors to the separation unit in the event the canister is purged, as explained above, or to the fuel tank in the event the latter's leak-tightness is diagnosed, again as explained above. A single pump, in this case the purge pump, is therefore sufficient for both purging the canister and diagnosing leak-tightness of the tank. The diagnostic pump and the fluid communication line dedicated to on-board fuel tank diagnostics can therefore be eliminated. The result is a simplified architecture with fewer components than in the prior art.

According to other optional features of the storage device, taken either alone or in combination:
   the separation unit can be a membrane separation unit. It is then necessary to use a proven type of separation unit to purge the canister;
   the purge pump can further act as a compressor for mixing air and hydrocarbon vapors coming from the canister. In this way, the vacuum pump used in the prior art can be eliminated, the presence of a compressor making it possible to ensure a pressure differential upstream and downstream of the separation unit (with an upstream pressure higher than the downstream pressure) so as to improve the diffusion of the mixture of air and hydrocarbon vapors, mainly hydrocarbon vapors, through the separation unit;
   said at least one solenoid valve may be a three-way solenoid valve. This results in an architecture with a single valve for guiding the mixture of air and hydrocarbon vapors;
   said at least one solenoid valve may comprise two solenoid valves, a first solenoid valve connecting the purge pump to the fuel tank and a second solenoid valve connecting the purge pump to the separation unit. This is an alternative architecture for managing the mixture of air and hydrocarbon vapors from the canister;
   the purge pump can have a nominal flow rate of between 5 and 25 liters per minute. This enables the pump to perform the various functions mentioned above;
   the fuel storage device can comprise an electronic control unit for electronically controlling the operating status of the purge pump and the opening configuration of said at least one solenoid valve. This allows combined management of the purge pump and solenoid valve, depending on the need to purge the canister or diagnose fuel tank leak-tightness;

the storage device can comprise several separation units mounted in series, a first separation unit being configured to receive a mixture of air and hydrocarbon vapors from the canister, at least one second separation unit being configured to receive a first hydrocarbon-poor fraction from another separation unit and to separate said poor fraction into a second hydrocarbon-rich fraction and a second hydrocarbon-poor fraction, the hydrocarbon-rich fraction being sent to the fuel tank. The aim here is to optimize the filtration of the mixture of air and hydrocarbon vapors by sending the fuel tank only a fraction that is as free as possible of hydrocarbon vapors, and sending the fuel tank the fraction richest in hydrocarbon vapors;

the storage device can comprise several separation units mounted in parallel, each separation unit being configured to receive a fraction of a mixture of air and hydrocarbon vapors from the canister and to separate said fraction of mixture of air and hydrocarbon vapors into a hydrocarbon-rich fraction and a hydrocarbon-poor fraction, said hydrocarbon-rich fraction being sent to the fuel tank and said hydrocarbon-poor fraction being sent to the canister. This enables a larger volume of air and hydrocarbon vapor mixture to be processed simultaneously; and the storage device can comprise a third solenoid valve in a fluid connection between the fuel tank and the canister. This makes it possible to block fluid communication between the fuel tank and the canister during the diagnosis of fuel tank leak-tightness.

Another object of the invention is a method for managing a mixture of air and hydrocarbon vapors from a canister of a fuel storage device according to any one of the preceding claims, the method comprising the following steps:

controlling the opening configuration of said at least one solenoid valve to allow selective passage of the mixture of air and hydrocarbon vapors either to the fuel tank in the event of a leak test of the tank, or to the separation unit in the event of canister purging, activating the canister purge pump, and delivering the mixture of air and hydrocarbon vapors from the canister to either the separation unit or to the fuel tank, depending on the opening configuration of said at least one solenoid valve.

This is the manifestation of the management of the mixture of air and hydrocarbon vapors by the fuel storage device disclosed above.

According to other optional features of the management method, taken either alone or in combination:

the method may comprise a step of activating the purge pump compressor when said at least one solenoid valve is configured to allow the mixture of air and hydrocarbon vapors to pass from the canister to the separation unit. This enables the pressure differential disclosed above to be achieved when the canister is purged; and the method may comprise a step of closing a third solenoid valve arranged on a fluid connection between the fuel tank and the canister when said at least one solenoid valve is configured to allow the passage of the mixture of air and hydrocarbon vapors from the canister to the fuel tank. This step increases the pressure in the fuel tank in the event the latter's leak-tightness is diagnosed.

The invention also relates to a device for managing a mixture of air and hydrocarbon vapors from a motor vehicle canister, the management device comprising:

at least one air and hydrocarbon vapor separation unit configured to receive the mixture of air and hydrocarbon vapor from the canister and to separate said mixture into a hydrocarbon-rich fraction and a hydrocarbon-poor fraction, the hydrocarbon-rich fraction being sent to a fuel tank, a purge pump for purging the canister configured to send the mixture of air and hydrocarbon vapors from the canister to the separation unit, and at least one solenoid valve arranged between the purge pump and the separation unit, said at least one solenoid valve being configured to selectively send the mixture of air and hydrocarbon vapors either to the separation unit or to the fuel tank.

This is the part of the motor vehicle fuel storage system specifically dedicated to managing the mixture of air and hydrocarbon vapors from the canister.

BRIEF DESCRIPTION OF THE FIGURES

The invention will be better understood from reading the following description, which is provided solely by way of example and with reference to the appended drawings, in which.

DETAILED DESCRIPTION

In the present description, it is possible to index certain elements or parameters, for example first element or second element as well as first parameter and second parameter or first criterion and second criterion, etc. In this case, it is a simple indexing for differentiating and naming similar but non-identical elements or parameters or criteria. This indexing does not mean that one element, parameter or criterion has priority relative to another, and such designations can easily be changed without departing from the scope of the present description.

Figure 1:
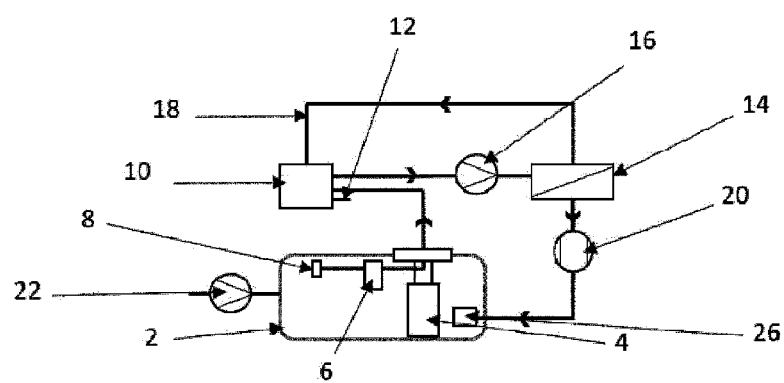
FIG. 1 is a representation of a fuel storage device for a motor vehicle according to the prior art.
Figure 2:
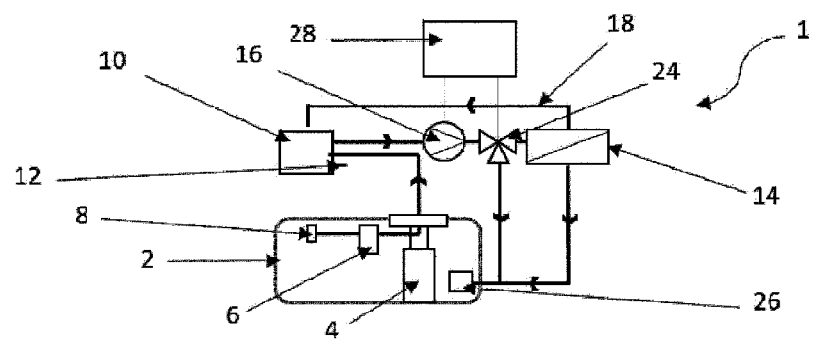
FIG. 2 is a representation of a fuel storage device for a motor vehicle according to the invention.

We refer to FIG. 2 showing an example of a fuel storage device 1 for a motor vehicle according to the invention. The numerical references used in the description of FIG. 1 are repeated in FIG. 2. Finally, FIGS. 1 and 2 comprise various arrows on the fluid communication lines, representing the direction of movement of fluids in these fluid communication lines. To enable gases and gas mixtures to flow according to the arrows shown in FIGS. 1 and 2, a set of non-return units, e.g. non-return valves, are arranged at the various fluid connections. Such use, known to the skilled person and not shown in the figures, will not be disclosed in detail in the present application.

According to this example, the fuel storage device 1 comprises a fuel tank 2 similar to those known in the prior art. This comprises a fuel pump 4, a fuel fill limiter 6 and an aeration device 8, mounted in series or separately from one another. These elements are known and will not be disclosed in detail in the present application.

A canister 10 is fluidically connected to the tank and is configured to receive a mixture of air and hydrocarbon vapors from the fuel tank 2. A filter, for example comprising activated carbon and housed in the canister 10, traps hydrocarbon vapors from the fuel tank 2. The canister 10 further comprises an air intake 12 allowing air to enter or exit the canister 10, in particular when the canister is purged.

A separation unit 14, fluidically connected to the canister 10 and the fuel tank 2, is configured to receive the mixture of air and hydrocarbon vapors from the canister 10 and to separate said mixture into a hydrocarbon-rich fraction and a hydrocarbon-poor fraction, the hydrocarbon-rich fraction being sent to the fuel tank 2 (note the presence of a diffuser 26 at the end of the fluid communication extending from the separation unit 14 to the fuel tank 2). The fraction poor in hydrocarbon vapors is returned to the canister 10 via return means, e.g. by a return line 18.

The separation unit 14 can be a membrane separation unit. In one example embodiment, this membrane is a hydrocarbon separation membrane using a material with a high permeability coefficient for fuel vapors and a low permeability coefficient for air. The membrane may comprise:
- a non-porous thin-film layer that preferentially allows fuel vapors to penetrate by diffusion and dissolution, and
- a porous support membrane layer supporting the non-porous thin-film layer.

The thin-film layer performs the main function of the membrane. It generally consists of a three-dimensional, insolubilized, cross-linked silicone polymer material with high hydrocarbon selectivity and permeability, or an elastomer material. The thin film layer can have a thickness of around 0.5 μm to 3 μm. Furthermore, a high level of hydrocarbon resistance is required for the porous support membrane layer. For example, ceramics are used in addition to synthetic resins such as polyimide (PI), polyetherimide (PEI) and polyvinylidene fluoride (PVDF). The membrane can have a structure in the form of a flat plate, a hollow fiber, a honeycomb, a spiral, etc.

According to one embodiment of the invention, the fuel storage device 1 comprises several separation units mounted in series:
- a first separation unit, for example the separation unit 14, being configured to receive a mixture of air and hydrocarbon vapors from canister 10;
- at least one second separation unit (not shown) being configured to receive a first hydrocarbon-poor fraction from another separation unit, e.g. the separation unit 14, and to separate said poor fraction into a second hydrocarbon-rich fraction and a second hydrocarbon-poor fraction, the hydrocarbon-rich fraction being sent to the fuel tank 2.

As explained above, this optimizes the treatment of the mixture of air and hydrocarbon vapors, so that only a fraction very poor in hydrocarbon vapors is sent to the canister 10.

According to another embodiment of the invention, the fuel storage device 1 comprises several separation units mounted in parallel, each separation unit being configured to receive a fraction of a mixture of air and hydrocarbon vapors from the canister 10, and to separate said fraction of mixture of air and hydrocarbon vapors into a hydrocarbon-rich fraction and a hydrocarbon-poor fraction. Said hydrocarbon-rich fraction is sent to the fuel tank 2 and said hydrocarbon-poor fraction is sent to the canister 10. According to this embodiment, there are thus several separation units fluidically connected to the purge pump 16 of the canister 10. This enables a larger volume of air and hydrocarbon vapor mixture to be processed simultaneously.

The purge pump 16 for purging the canister 10 is arranged between the canister 10 and the separation unit 14. It extracts a mixture of air and hydrocarbon vapors from the canister 10, when activated as a result of the need to purge the canister 10 or diagnose the leak-tightness of the fuel tank 2.

The purge pump 16 preferentially has a nominal flow rate of between 5 and 25 liters per minute. Generally speaking, the nominal flow rate of the purge pump 16 is chosen so that it can adequately convey the mixture of air and hydrocarbon vapors to the separation unit 14 or to the fuel tank 2.

Preferentially, the purge pump 16 further acts as a compressor for mixing air and hydrocarbon vapors coming from the canister 10. As shown in FIG. 2, a vacuum pump 20 is no longer required downstream of the separation unit 14. The pressure differential on both sides of the separation unit 14 is therefore achieved by an overpressure upstream of the separation unit 14, rather than by negative pressure downstream thereof. In one example, the overpressure and the negative pressure are relative to atmospheric pressure.

A solenoid valve 24 is arranged between the purge pump 16 and the separation unit 14, the solenoid valve 24 being configured to selectively send the mixture of air and hydrocarbon vapors either to the separation unit 14 or to the fuel tank 2. This selective dispatch depends on the specific need to purge the canister 10 or to check the leak-tightness of the fuel tank 2.

The solenoid valve 24 allows the mixture of air and hydrocarbon vapors to be returned directly to the fuel tank 2. "Return directly" means returning the mixture of air and hydrocarbon vapors to the fuel tank 2 without passing through an intermediate structure. In other words, the solenoid valve 24 is connected to the fuel tank 2 only by a fluid connection line, in order to return the mixture of air and hydrocarbon vapors to the fuel tank.

As shown in FIG. 2, the solenoid valve 24 can be a three-way valve. The latter is then fluidically connected to the canister 10, the separation unit 14 and the fuel tank 2. Alternatively to using a three-way solenoid valve, it is possible to use two solenoid valves, a first solenoid valve connecting the purge pump 16 to the fuel tank 2 and a second solenoid valve connecting the purge pump 16 to the separation unit 14. For example, a unit may be envisaged comprising two solenoid valves mounted in parallel, comprising a common inlet, each solenoid valve having its own outlet connected either to the fuel tank 2 or to the separator unit 14. Of course, the number of solenoid valves used can be modulated based on the architecture of the system, and more specifically based on the number of separation units to be connected to the purge pump 16.

A fourth channel can be provided on the solenoid valve 24 to connect the fluid communication thereto from the part of separation unit 14 collecting the hydrocarbon-rich fraction, so as to use the existing fluid communication between the solenoid valve 24 and the fuel tank 2 to send this hydrocarbon-rich fraction to the fuel tank 2.

The solenoid valve 24 therefore comprises four channels. It is fluidically connected to the canister 10 (to receive the mixture of air and hydrocarbon vapors), twice to the separation unit 14 (to send the mixture of air and hydrocarbon vapors and to receive the hydrocarbon-rich fraction), and to the fuel tank 2 (to send the mixture of air and hydrocarbon vapors in the event of a leak test of the fuel tank 2 or the hydrocarbon-rich fraction in the event of purging of the canister 10). The solenoid valve 24 can be a four-way valve. Multiple solenoid valves are also possible. Control of the solenoid valve 24 is therefore programmed so that its opening configurations correspond to the desired routing.

The assembly formed by the separation unit 14, the purge pump 16 and the solenoid valve 24 makes up a device for managing a mixture of air and hydrocarbon vapors from the motor vehicle canister 10.

An electronic control unit 28 can be provided to monitor the operating status of the purge pump 16 and the opening configuration of the solenoid valve 24. It is therefore possible to control the operation of the purge pump 16 and the solenoid valve 24 via the same electronic control unit 28, in order to activate the purge pump 16 and place the solenoid valve 24 in an open configuration in line with the need to purge the canister 10 or check the leak-tightness of the fuel tank 2. To ensure constant performance of the separation unit 14, the pressure differential on both sides of the separation unit 14 must be kept constant, simply by keeping the pressure upstream of the separation unit 14 constant. In one example, the electronic control unit 28 controls the purge pump 16 so as to keep the pressure upstream of the separation unit 14 constant, for example at three bars. The electronic control unit 28 therefore comprises a predetermined control program stored in non-volatile memory, and a processor controlling the purge pump 16 and solenoid valve 24 based on the predetermined control program. It is also possible that the electronic control unit 28, by interacting with an internal pressure sensor in the fuel tank 2 (not shown), can monitor the pressure evolution in the fuel tank 2 subsequent to the delivery of the mixture of air and hydrocarbon vapors from the canister 10 to the fuel tank 2.

According to an embodiment which is not shown, the purge pump 16 can be a two-way pump capable of sending the mixture of air and hydrocarbon vapors from the canister 10 to the separation unit 14 and the hydrocarbon-poor fraction from the separation unit 14 to the canister 10. The return line 18 can therefore be dispensed with. The solenoid valve 24 is controlled so as to allow this passage (its opening configuration is the same for both of the aforementioned routes). In this case, the electronic control unit 28 allows special control of the purge pump 16. The latter first sends the mixture of air and hydrocarbon vapors from the canister 10 to the separation unit 14, maintains a pressure upstream of the separation unit 14 higher than the downstream pressure (if there is no vacuum pump downstream of the latter), and finally, by reversing the operation of the purge pump 16, extracts the hydrocarbon-poor fraction from the separation unit 14 to send it to the canister 10.

A third solenoid valve (not shown, in addition to a solenoid valve 24 or two solenoid valves as disclosed above) can be arranged on a fluid connection between the fuel tank 2 and the canister 10. The latter can be closed (e.g. by being controlled by the electronic control unit 28) during fuel tank leak diagnostics to prevent the passage of gas from the fuel tank to the canister 10.

The method for managing a mixture of air and hydrocarbon vapors from a canister 10 comprises the following steps:
controlling the opening configuration of the solenoid valve 24 (or solenoid valves) to allow selective passage of the mixture of air and hydrocarbon vapors either to the fuel tank 2 in the event of a leak test of the latter, or to the separation unit 14 in the event of purging of the canister 10. This can be done by the electronic control unit 28,
activating the purge pump 16 for purging the canister 10. The latter will therefore extract the mixture of air and hydrocarbon vapors from the canister 10, regardless of the canister's destination, and
delivering the mixture of air and hydrocarbon vapors from the canister 10 to either the separation unit 14 or to the fuel tank 2, based on the opening configuration of the solenoid valve 24. Depending on the opening configuration of the solenoid valve 24 (or solenoid valves), this enables the mixture of air and hydrocarbon vapors to be treated via one or more separation units, or the internal pressure of the fuel tank 2 to be increased.

If the canister 10 is purged and the mixture of air and hydrocarbon vapors is treated by the separation unit 14, the compressor of the purge pump 16 can be activated (e.g. by the electronic control unit 28) to obtain the pressure differential on both sides of the separation unit 14 as disclosed previously.

The third solenoid valve arranged on the fluid connection between the fuel tank 2 and the canister 10 can also be closed when the solenoid valve 24 is configured to allow the mixture of air and hydrocarbon vapors to pass from the canister 10 to the fuel tank 2, for the reasons of increasing the internal pressure of the fuel tank 2 disclosed previously.

LIST OF REFERENCES

1: fuel storage device
2: fuel tank
4: fuel pump
6: fuel fill limiter
8: aeration device
10: canister
12: air intake
14: separation unit
16: purge pump
18: return line
20: vacuum pump
22: diagnostic pump
24: solenoid valve
26: diffuser
28: electronic control unit

The invention claimed is:
1. A fuel storage device for a motor vehicle, comprising:
a fuel tank,
a canister fluidically connected to the fuel tank and configured to receive a mixture of air and hydrocarbon vapors from the fuel tank,
at least one separation unit fluidically connected to the canister and the fuel tank, the separation unit being configured to receive the mixture of air and hydrocarbon vapors from the canister and to separate said mixture into a hydrocarbon-rich fraction and a hydrocarbon-poor fraction, the hydrocarbon-rich fraction being sent to the fuel tank,
return means for returning the hydrocarbon-poor fraction to the canister,
a purge pump for purging the canister which is arranged between the canister and the separation unit,
at least one solenoid valve arranged between the purge pump and the separation unit,
wherein said at least one solenoid valve is configured to send the mixture of air and hydrocarbon vapors to the separation unit, and the at least one solenoid valve is configured to send the mixture of air and hydrocarbon vapors directly to the fuel tank.

2. The fuel storage device according to claim 1, wherein the separation unit is a membrane separation unit.

3. The fuel storage device according to claim 1, wherein the purge pump further forms a compressor for mixing air and hydrocarbon vapors from the canister.

4. The fuel storage device according to claim 1, wherein said at least one solenoid valve is a three-way solenoid valve.

5. The fuel storage device according to claim 1, wherein said at least one solenoid valve comprises two solenoid valves, a first solenoid valve connecting the purge pump to the fuel tank and a second solenoid valve connecting the purge pump to the separation unit.

6. The fuel storage device according to claim 1, wherein the purge pump has a nominal flow rate of between 5 and 25 liters per minute.

7. The fuel storage device according to claim 1, comprising an electronic control unit for electronically controlling the operating status of the purge pump and the opening configuration of said at least one solenoid valve.

8. The fuel storage device according to claim 1, comprising several separation units mounted in series, a first separation unit being configured to receive a mixture of air and hydrocarbon vapors from the canister, at least one second separation unit being configured to receive a first hydrocarbon-poor fraction from another separation unit and to separate said poor fraction into a second hydrocarbon-rich fraction and a second hydrocarbon-poor fraction, the hydrocarbon-rich fraction being sent to the fuel tank.

9. The fuel storage device according to claim 1, comprising several separation units mounted in parallel, each separation unit being configured to receive a fraction of a mixture of air and hydrocarbon vapors from the canister and to separate said fraction of mixture of air and hydrocarbon vapors into a hydrocarbon-rich fraction and a hydrocarbon-poor fraction, said hydrocarbon-rich fraction being sent to the fuel tank and said hydrocarbon-poor fraction being sent to the canister.

10. The fuel storage device according claim 1, comprising a third solenoid valve arranged on a fluid connection between the fuel tank and the canister.

11. A method for managing a mixture of air and hydrocarbon vapors from a canister of a fuel storage device according to claim 1, the method comprising the following steps:
controlling the opening configuration of said at least one solenoid valve to allow selective passage of the mixture of air and hydrocarbon vapors either directly to the fuel tank in the event of a leak test of the fuel tank, or to the separation unit in the event of canister purging;
activating the purge pump for purging the canister; and
delivering the mixture of air and hydrocarbon vapors from the canister to either the separation unit or directly to the fuel tank,
wherein the control of the at least one solenoid valve is configured to send the mixture of air and hydrocarbon vapors to the separation unit depending on the opening configuration of said at least one solenoid valve, and the control of the at least one solenoid valve is configured to send the mixture of air and hydrocarbon vapors directly to the fuel tank depending on the opening configuration of said at least one solenoid valve.

12. The method for managing a mixture of air and hydrocarbon vapors according to claim 11, comprising a step of activating the compressor of the purge pump when said at least one solenoid valve is configured to allow the mixture of air and hydrocarbon vapors to pass from the canister to the separation unit.

13. The method for managing a mixture of air and hydrocarbon vapors according to claim 11, comprising a step of closing a third solenoid valve arranged on a fluid connection between the fuel tank and the canister when said at least one solenoid valve is configured to allow the passage of the mixture of air and hydrocarbon vapors from the canister to the fuel tank.

14. A device for managing a mixture of air and hydrocarbon vapors from a motor vehicle canister, the management device comprising:
at least one air and hydrocarbon vapor separation unit configured to receive the mixture of air and hydrocarbon vapor from the canister and to separate said mixture into a hydrocarbon-rich fraction and a hydrocarbon-poor fraction, the hydrocarbon-rich fraction being sent to a fuel tank;
a purge pump for purging the canister configured to send the mixture of air and hydrocarbon vapors from the canister to the separation unit; and
at least one solenoid valve arranged between the purge pump and the separation unit,
wherein said at least one solenoid valve is configured to send the mixture of air and hydrocarbon vapors to the separation unit, and the at least one solenoid valve is configured to send the mixture of air and hydrocarbon vapors directly to the fuel tank.

* * * * *